United States Patent [19]

Lewis et al.

[11] Patent Number: 5,566,241
[45] Date of Patent: *Oct. 15, 1996

[54] METHOD AND APPARATUS FOR PRESENTATION OF ON-LINE DIRECTIONAL SOUND

[75] Inventors: Russell F. Lewis; Steven F. Martin, both of Dallas; Dale A. Cone, Garland; Norman A. Josephson, Dallas, all of Tex.

[73] Assignee: Texas Instruments Incorporated, Dallas, Tex.

[*] Notice: The term of this patent shall not extend beyond the expiration date of Pat. No. 5,322,411.

[21] Appl. No.: 483,781

[22] Filed: Jun. 7, 1995

Related U.S. Application Data

[63] Continuation of Ser. No. 593,702, Oct. 5, 1990, Pat. No. 5,469,511.

[51] Int. Cl.[6] ................................................. H04R 25/00
[52] U.S. Cl. .......................... 381/113; 381/190; 434/43; 434/44; 348/121
[58] Field of Search .................... 381/173, 25, 183, 381/187, 17, 74, 151, 190, 178, 182, 186; 181/129, 137, 144; 434/43, 44, 307 R; 348/121

[56] References Cited

U.S. PATENT DOCUMENTS

| | | | |
|---|---|---|---|
| 4,453,044 | 6/1984 | Murphy | 179/110 A |
| 4,515,997 | 5/1985 | Stinger, Jr. | 179/111 R |
| 4,636,866 | 1/1987 | Hattori | 358/236 |
| 4,807,202 | 2/1989 | Cheui et al. | 367/129 |
| 5,115,472 | 5/1992 | Park et al. | 381/152 |
| 5,177,872 | 1/1993 | Lewis et al. | 33/366 |
| 5,322,441 | 6/1994 | Lewis et al. | 340/686 |

Primary Examiner—Jeffery Hofsass
Assistant Examiner—Nina Tong
Attorney, Agent, or Firm—W. Daniel Swayze, Jr.; W. James Brady, III; Richard L. Donaldson

[57] ABSTRACT

This invention relates to sound systems and more particularly to such systems that present sound to a listener in a "full wrap-around" manner.

11 Claims, 2 Drawing Sheets

METHOD AND APPARATUS FOR PRESENTATION OF ON-LINE DIRECTIONAL SOUND

This is a continuation of application Ser. No. 07/593,702, filed Oct. 5, 1990, now U.S. Pat. No. 5,469,511.

CROSS REFERENCE TO RELATED APPLICATIONS

The following patent applications are cross-referenced to one another, and all have been assigned to Texas Instruments Incorporated. These applications have been concurrently filed and are hereby incorporated in this patent application by reference.

| Ser. No. or U.S. Pat. No. | Title |
|---|---|
| U.S. Pat. No. 5,322,441 | Method and Apparatus for Providing a Portable Visual Display |
| U.S. Pat. No. 5,177,872 | Method and Apparatus for Monitoring Physical Positioning of a User |
| U.S. Pat. No. 5,469,511 | Method and Apparatus for Presentation of On-Line Directional Sound |

BACKGROUND OF THE INVENTION

There are many situations in which full wrap-around sound is desirable for presentation to a listener. One such system is in artificial reality systems where an artificial environment has been created for a user. This environment would typically contain scenes that are created surrounding the viewer, and as the viewer moves in any plane relative to the environment, the scene changes as it would if the viewer were moving in a real environment.

In some situations sound is presented to the viewer in conjunction with the projected images such that as the viewer (or sound source) moves closer or further away, the sound will increase or decrease in volume and frequency. At times the sound would appear to come from directly behind, over or below the listener.

Conventional stereophonic speakers which are placed over each ear can only approximate the direction of the sound from one side or the other. These speakers are expensive and do not satisfy the requirement that the listener actually hear the sound coming from behind, above, below or from one side.

Currently, surround sound or holographic sound or what is called 3-D sound, is generated by using powerful digital signal processors which are basically stereo earphones tricking the ear into perceiving that the sound is coming from behind, around, or from different distances.

Thus, a need exists in the art for a speaker system which is lightweight, inexpensive and yet which can create the illusion of sound coming from an omnipresent direction.

There is a further need in the art for such a system which can be created and controlled by an artificial reality system and is portable and generatable under processor control.

SUMMARY OF THE INVENTION

An omnipresent sound system has been constructed using a series of discreet piezoelectric elements in a headband around the user's head. Each element is individually controllable from signals provided to it from the processor. Thus, sound can be programmed to occur at any position around the user's head.

By judiciously selecting the volume and timing of the sounds from each of the individual piezoelectric elements, the listener will have the sensation of omnipresent stereographic sound which is keyed to the scene being viewed by the viewer in the artificial reality system. The scene being viewed is, in turn, controllable by the sensed motion of the user.

Thus, for example, a user can be walking (in the artificially created environment) toward a siren (for example, a flashing light on a vehicle), and the scene of the siren source (vehicle) would be getting larger. Concurrently, the sound from the siren would become louder, and the frequency of the siren could also be changing depending upon the approach angle. Of course, the vehicle could be moving relative to the viewer and the sound would change accordingly.

The system to create this illusion of changing sound is designed to send signals to different ones of the piezoelectric elements from time to time to create the illusion of the sound moving. These sound attributes of the created environment are stored in a portable processor and provided to the viewer in conjunction with the proper scene. Thus, the system knows how far the viewer is from an object so it, in turn, knows which one of the piezoelectric elements to turn on. The system knows that as the viewer approaches to view objects, the sound should get louder. If the viewer is looking directly at an object, the sound should come from in front. The viewed objects can also have boundary boxes around them so if the viewer moves into the object, a bump can be heard. In addition, the piezoelectric devices can be made to physically vibrate, thereby creating the "feeling" of sound impacting the viewer.

Since the system is object oriented, the closer the viewer gets to an object, the more the sound will change. This is important for applications, such as military and flight simulations.

Thus, it is a technical advantage of the invention to provide a sound system which is omnipresent with respect to a viewer and which is lightweight and inexpensive to manufacture.

It is a further technical advantage of this invention that such a system is designed to respond to signals provided by a portable processor and generated in conjunction with an artificial reality system to provide sound in coordination with the derived physical presentation of the environment around the viewer.

BRIEF DESCRIPTION OF THE DRAWINGS

A more complete understanding of the present invention may be acquired by referring to the detailed description and claims when considered in connection with the accompanying drawings in which like reference numbers indicate like features wherein:

DETAILED DESCRIPTION OF THE INVENTION

Figure 1:
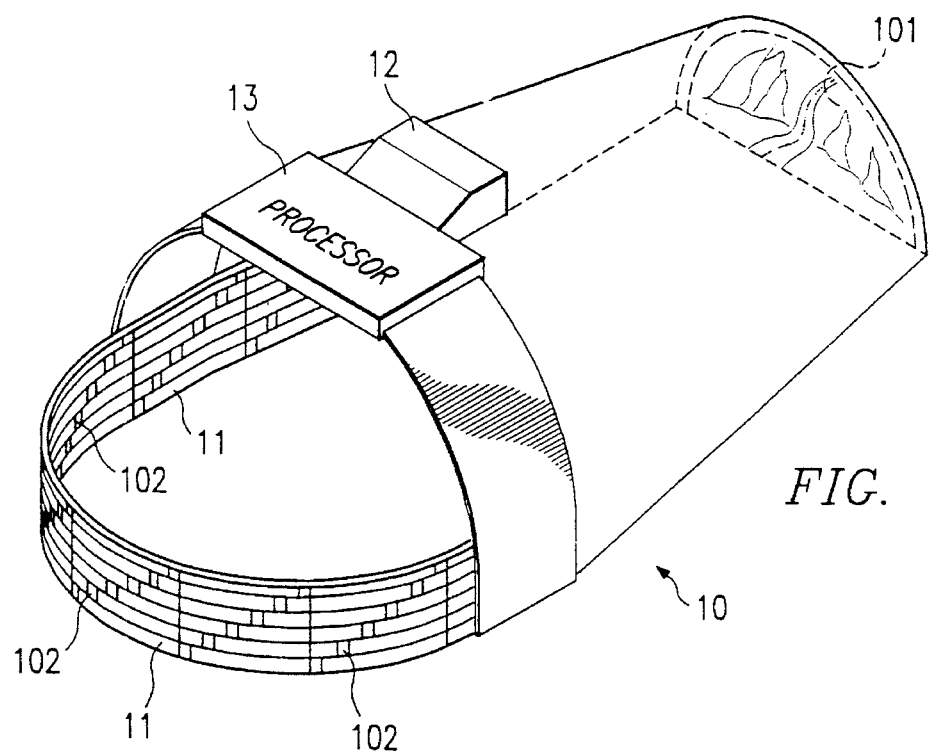
FIG. 1 is a helmet mounted virtual reality device with the speaker elements exposed.

FIG. 1 depicts a portable virtual reality system 10 worn by an individual on his or her head. System 10 consists of a color liquid display screen 101, an array of piezoelectric film elements 102, a position-orientation sensor 12 and a processor 13.

Processor 13 generates a visual picture according to helmet 10 orientation information from position-orientation sensor 12 and on board software. Processor 13 creates a three dimensional environment and projects a view of it on screen 101. As the user moves his/her head and, hence, helmet 10, processor 13 changes the image on screen 13 to mimic the view the user would perceive if he/she were actually in the three dimensional environment. Similarly, if the user walks or runs to a new location, processor 13 changes the image on screen 101 as if the user walked or ran the same distance and direction in the three dimensional environment.

Note that while screen 101 is a color liquid crystal display, it can be any type of display and can, for example, be positioned close to a user's eyes with a short focal length.

Processor 13 also generates a sound field through piezoelectric elements 102 of sound band 11. Individual elements 102 are separately driven by processor 13. The processor selectively powers piezoelectric film elements 102 on an individual basis to create a directional sound field. By doing so, the processor can create the illusion of a moving sound source and of a stationary sound source when the user's head or body moves. The sound source would be stationary, i.e., the same sound would continue to come from the same elements when the user stops moving. The sound elements can be small chips or elongated bands, each driven by a separate signal from the processor.

Figure 2:
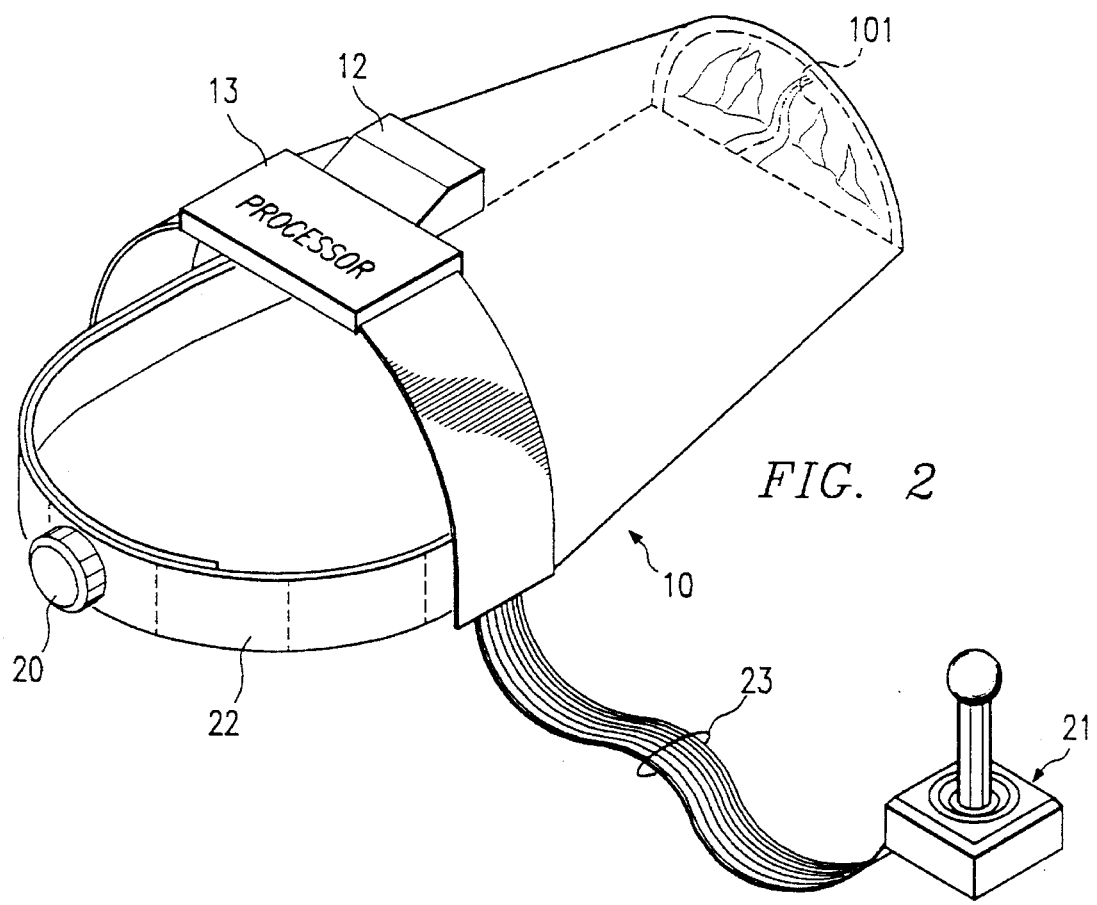
FIG. 2 is also a helmet mounted virtual reality device.

FIG. 2 shows a system in which the user, using control 21, manually changes the presented image or manually creates a change in direction or speed with respect to the created environment. Band 22 contains elements 102 and can be adjusted via tightening mechanism 20, which can also be a volume control for the elements.

Figure 3:
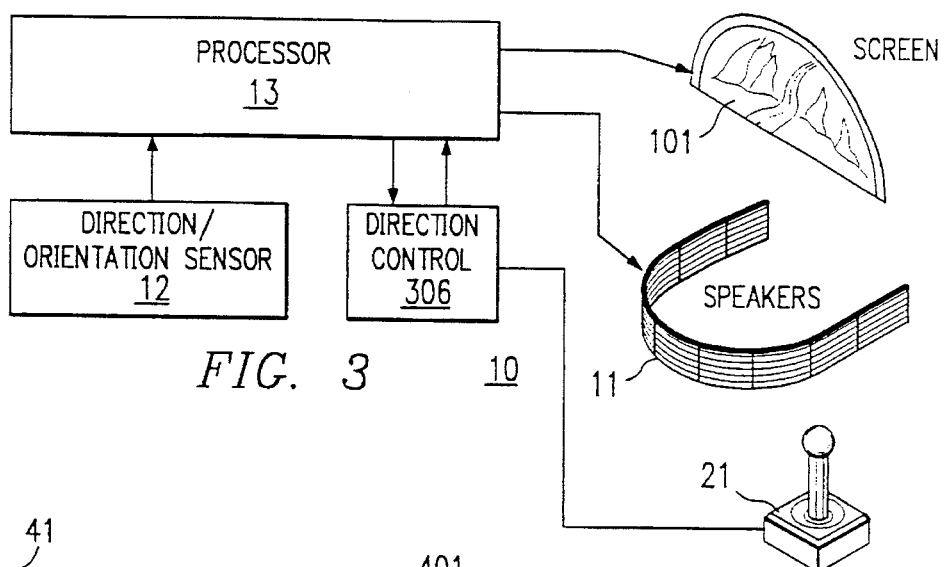
FIG. 3 is a schematic representation of a simulated reality system.

FIG. 3 schematically depicts processor 13, screen 101, speaker elements 11, joystick 21, position-orientation sensor 12 and direction control module 306. Processor 13 takes graphic information stored in a data base and generates images that are displayed on screen 101. Processor 13 also generates sound projected from piezoelectric film segments 102. Processor 13 could be a single processor or multiple processors such as a graphics processor from the TMS340 series and a digital signal processor from the TMS320 series, all available from Texas Instruments Incorporated. The '340 generates images shown on screen 101 and the '320 generates sound on element band 11. Connected to processor 13 is a position-orientation sensor 12. Position-orientation sensor 12 senses the direction that the user is looking. A flux gate compass (not shown) may also be linked to processor 13 to provide absolute north-south orientation information. Direction control block 306 provides processor 13 with information indicating the user's location and view within the three dimensional environment. Direction control block 306 receives user orientation information from position sensor 12 through processor 13 and from the user directly through joystick 21. Direction control block 306 can determine the user's position within the three dimensional environment by mathematically integrating the instantaneous orientation information from position-orientation sensor 12.

Figures 4A, 4B, 4C:
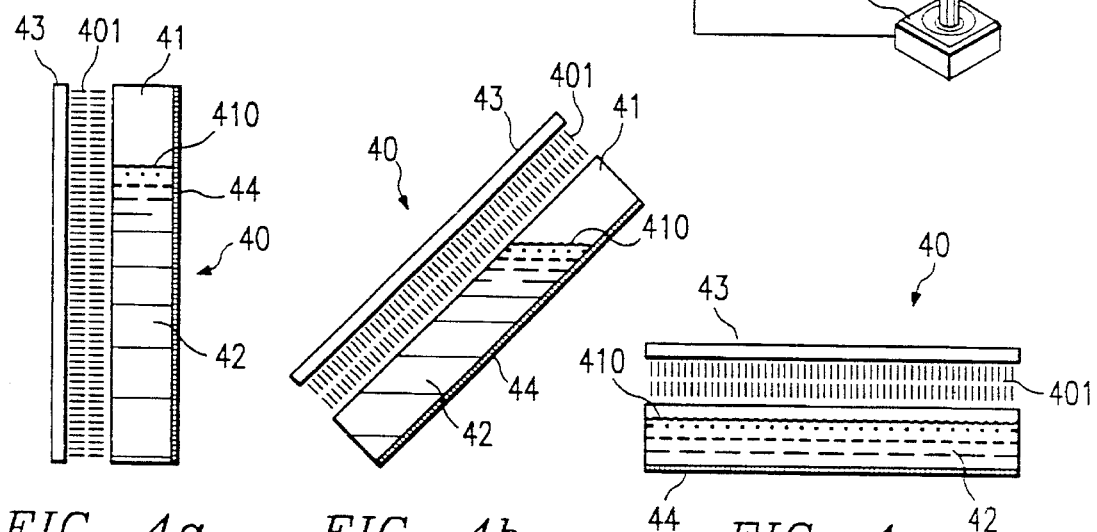
FIGS. 4a, 4b and 4c depict a CCD position-orientation sensor in various orientations.

FIGS. 4a, b and c depict an element in an embodiment of a position and orientation sensor 12. Container 40 is fluid filled and has light source 43 (or other source of electronic signals such as infrared or microwave) on one side and CCD 44 ("charge coupled device") or other electronic signal detectors on the other. CCD 44 is able to sense where light 401 impinges on it from source 43 and when light is blocked by fluid 42. FIGS. 4b and 4c depict different orientations of assembly 40 and hence depict different levels of fluid in device 40.

In FIG. 4b as assembly 40 is tilted down, a larger area of CCD 44 is blocked by fluid 42, allowing less light 401 to strike CCD 44. The amount of light impacting CCD 44 can be detected, for example, by using an array of individual CCD (or other detectors) devices, and monitoring, perhaps on a digital basis, the light level. When horizontal, no light gets through to CCD 44. In FIG. 4c fluid completely covers CCD 44.

Figure 5:
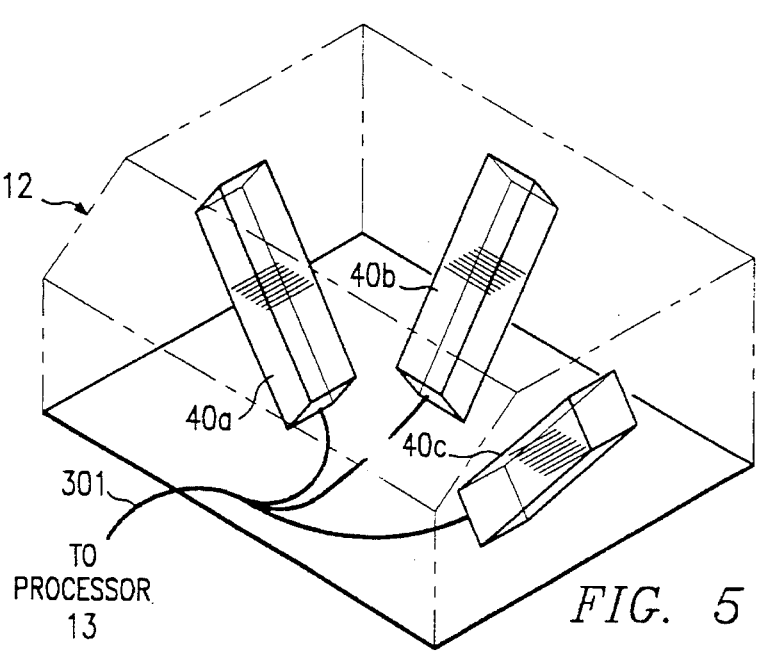
FIG. 5 shows a three-dimensional position-orientation sensor.

In FIG. 5 a number of CCD assemblies 40 can be combined to indicate the tilt in different axes. Three assemblies, 40a, 40b and 40c are aligned along mutually orthogonal axes and encapsulated in direction sensor 12 to detect motion in three dimensions. The orientation information from assemblies 40a, 40b and 40c is transmitted through cable 301 to processor 13. The CCD assemblies can also provide information on the motion and position of sensor 12 by examining the output of CCD device over time.

It is possible to use only two devices to obtain all three orientations by taking into account the slope of liquid within each device 40.

Although this description describes the invention with reference to the above specified embodiments, it is but one example, and the claims, not this description, limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A sound system for use in creating the illusion of holographic sound in an artificial reality system, said sound system comprising:
   a headband to be worn by a listener;
   a plurality of discrete vibratory elements placed circumferentially around said headband, said elements each adapted for receiving electrical impulse signals and for producing sound waves in response thereto; and
   a processor for selectively producing said electrical impulse signals to drive the discrete vibratory elements.

2. The system set forth in claim 1 wherein said vibratory elements are piezoelectric strips.

3. The system set forth in claim 1 wherein said artificial reality system is operable for creating artificial viewing environments for a plurality of viewers, said environments each including predefined structures, said artificial reality system comprising:
   a geographical sensor connectable to each said viewer for providing data pertaining to the relative movement of each of said viewers;
   a processor local to each of said viewers for accepting said data from each of said viewers and from a plurality of other viewers; and
   a presentation media for providing views of said created environment to each of said viewers, said views controlled by said local processor and dependent upon said accepted data from each of said viewers and data from said other of said viewers; and
   wherein said processor is further operative for coordinating the provision of said impulse signals to said elements in association with said provided views to each of said viewers.

4. The system set forth in claim 3 wherein said artificial environment for each of said viewers is created by said local processor and wherein the environment and said impulse signals for each of said viewers is unique to each of said viewers.

5. The system set forth in claim 1 wherein said artificial reality system is operable for creating an artificial viewing environment for a viewer, said environment including predefined structures, said artificial reality system comprising:

a geographical sensor connectable to said viewer for providing data pertaining to the relative movement of said viewer;

a processor local to said viewer for accepting said data from said viewer;

a presentation media for providing views of said created environment to said viewer, said views controlled by said local processor and dependent upon said accepted data from said viewer; and wherein said processor is further operative for coordinating the provision of said impulse signals to said elements in association with said provided views to said viewer.

6. The method of creating a sound system comprising the steps of:

placing a headband around the head of a listener;

distributing a plurality of discrete vibratory elements circumferentially around said headband, said elements each adapted for receiving electrical impluse signals and for producing sound waves in response thereto; and driving said discrete vibratory elements by a processor, said processor producing said electrical impluse signals.

7. The method set forth in claim 6 further comprising the step of:

providing electrical impulses to selected discrete elements in accordance with the direction of origin from which a particular sound is to be perceived by said listener.

8. The method set forth in claim 7 wherein said vibratory elements are piezoelectric elements.

9. The method set forth in claim 6 further comprising the step of:

associating said sound with an artificial reality system which is operable for creating artificial viewing environments for a plurality of listeners, said environments each including predefined structures.

10. The method set forth in claim 9 further comprising the steps of:

connecting a geographical sensor to each of said listeners for providing data pertaining to the relative movement of each of said listeners;

accepting, via a processor local to each said listener, said data from each of said listeners and from a plurality of other of said listeners; and providing views of said created environment to each said listeners, said views controlled by said local processor and dependent upon said accepted data from each said listeners and data from said other of said listeners.

11. The method set forth in claim 9 wherein said artificial environment for each said listeners is created by said local processor and wherein the environment and said impulse signals for each of said listeners is unique to each of said listeners.

* * * * *